March 3, 1970   M. K. MAGRUDER   3,498,638
QUICK COUPLER

Filed May 6, 1968   2 Sheets-Sheet 1

INVENTOR.
M. K. MAGRUDER

March 3, 1970  M. K. MAGRUDER  3,498,638
QUICK COUPLER

Filed May 6, 1968  2 Sheets-Sheet 2

INVENTOR.
M. K. MAGRUDER

United States Patent Office 3,498,638
Patented Mar. 3, 1970

3,498,638
QUICK COUPLER
Michael Keith Magruder, Waterloo, Iowa, assignor to Deere & Company, Moline, Ill., a corporation of Delaware
Filed May 6, 1968, Ser. No. 726,711
Int. Cl. B60d 1/04, 1/12
U.S. Cl. 280—479                    7 Claims

ABSTRACT OF THE DISCLOSURE

A quick coupler in which the latching mechanism for the lower hooks is operated through the movements of a pin which extends through cooperating slots provided in the coupler leg and latch plate. The latch plate is pivotally mounted to the coupler leg, the slots extend obliquely with respect to one another, and the slot in the coupler leg is of arcuate shape so that as the pin follows the arcuate slot, the latch plate moves about its pivot between an operative and inoperative position and is positively locked in the operative position.

Background of the invention

The present invention relates generally to a quick coupler for facilitating the attachment of mounted or semi-mounted implements to a tractor provided with a power-operated three-point hitch.

Due to the wide acceptance of the three-point hitch linkage for attaching mounted and semi-mounted implements to tractors and the need for rapid and convenient interchange of the tractor with different implements, the quick coupler came into existence. The typical quick coupler consists of a generally vertically extending frame which is coupled to the power-operated three-point hitch linkage of a tractor and is provided with rearwardly extending projections with upwardly open notches or hooks adapted to receive the spaced draft pins mounted on the implement. The quick coupler is also provided with some latching means to keep the implement draft pins in the hooks during operation.

The quick couplers as above described have greatly simplified the attachment of an implement to the tractor, but experience has proven that the present latching mechanisms employed to hold the implement draft pins within the hooks on the coupler are not entirely satisfactory. Many of the presently used latching mechanisms can be accidentally moved to a release position so that the implement can become disconnected from the tractor during operation. Also, many presently used latching mechanisms are spring biased to their operative or locking position, but there is no adequate manner of signaling the operator if the spring fails to move the latching mechanism to the operative position.

Summary of the invention

An object of the present invention is to provide a quick coupler with improved latch means to hold the lower hitch pins of an implement within the lower hook means of the coupler.

A more specific object of the present invention is to provide a quick coupler with a latching means which is controllable by the operator and movable between an operative and inoperative position and which is positively locked in the operative position.

An additional object of the present invention is to provide an improved latching means for a quick coupler in which the latching means is movable between an operative and inoperative position and is spring biased to its operative position and which provides an easily noticeable signal to the operator in the event that the latching means fails to move to its operative position.

The above and other objects and advantages of the present invention will become apparent to those skilled in the art from a reading of the following description taken in conjunction with the accompanying drawing.

Description of the preferred embodihent

Figure 1:
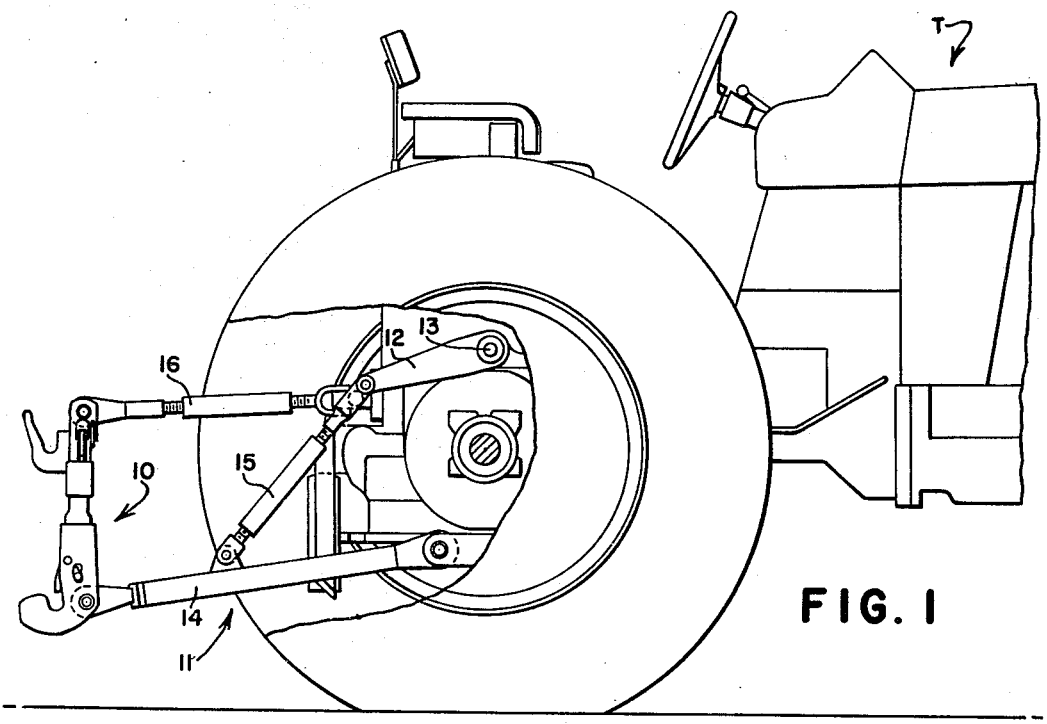
FIG. 1 is a side elevational view of the rear portion of a tractor provided with a power-operated three-point hitch having a quick coupler secured to the rear end thereof, with parts broken away to illustrate the three-point hitch.
Figure 2:
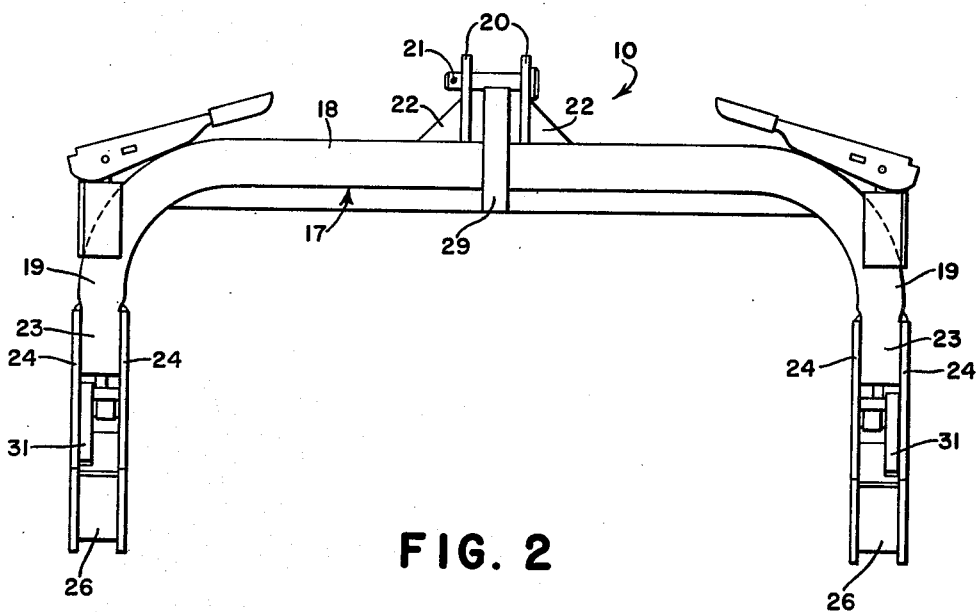
FIG. 2 is a rear elevational view of a quick coupler constructed in accordance with the principles of the present invention.

Referring now to the drawings and in particular to FIG. 1, a quick coupler which is constructed in accordance with the principles of the present invention is indicated generally at 10 and illustrated as being attached to a three-point hitch 11 on a conventional tractor T. The three-point hitch 11 includes a pair of lift arms 12 which are secured to a rockshaft 13. The free ends of the lift arms 12 are secured to a pair of spaced lower draft links 14 by a pair of drop links 15 which are pivotally connected at their upper ends to the lift arms 12 and are pivotally connected at their lower ends to the draft links 14. The forward ends of the draft links 14 are pivotally secured to the tractor while the rear ends thereof are pivotally connected to the quick coupler 10. The upper link 16 of the three-point hitch is pivotally secured at its forward end to the tractor and its rearward end is pivotally connected to an upper portion of the quick coupler 10.

The quick coupler comprises a transverse vertical section made up of a generally inverted U-shaped member 17 that includes an upper transverse member 18 and a pair of depending legs 19. A pair of lugs 20 are secured to the central portion of the member 18 and form a bracket to receive the rear end of the upper hitch link 16. The lugs 20 are apertured to receive a connecting pin 21 which extends through the lugs 20 and an opening provided in the rear end of the upper hitch link 16. Gussets 22 are welded or otherwise suitably secured to the member 18 and to the lugs 20 to provide additional strength for the connection between the member 18 and lugs 20.

The member 18 is preferably formed as a square pipe, and the legs 19 are flattened as at 23 to provide an enlarged area for securing pairs of jaw plates 24. The jaw plate 24 are secured to the associated flattened portions 23 by welding. The lower end of each jaw plate 24 is notched to provide upwardly facing hooks 25 which receive the spaced lower hitch pins of an associated implement. The lower ends of each pair of jaw plates 24 are interconnected by reinforcing blocks 26 and 27 which are welded between the jaw plates. The jaw plates 24 are apertured as at 28 to receive connecting pins, each of which extends through a pair of the jaw plates 24 and an opening provided in the rear end of one of the draft links 14.

A rearwardly extending and upwardly open hook member 29 is fixed to the central portion of the member 18 and is adapted to receive the upper hitch pin provided on an associated implement.

The implement coupler so far described is of generally conventional construction and operated in a well-known manner. Specifically, when it is desired to attach an implement to the tractor, the power-operated three-point hitch 11 is lowered to lower the quick coupler 10. The tractor is then backed to the implement until the lower hooks 25 and upper hook 29 are positioned beneath the lower and upper hitch pins on the implement. The quick coupler is then raised to bring the hooks 25 and 29 into contact with the implement hitch pins. Additional upward movement of the quick coupler will now raise the associated implement.

Figure 3:
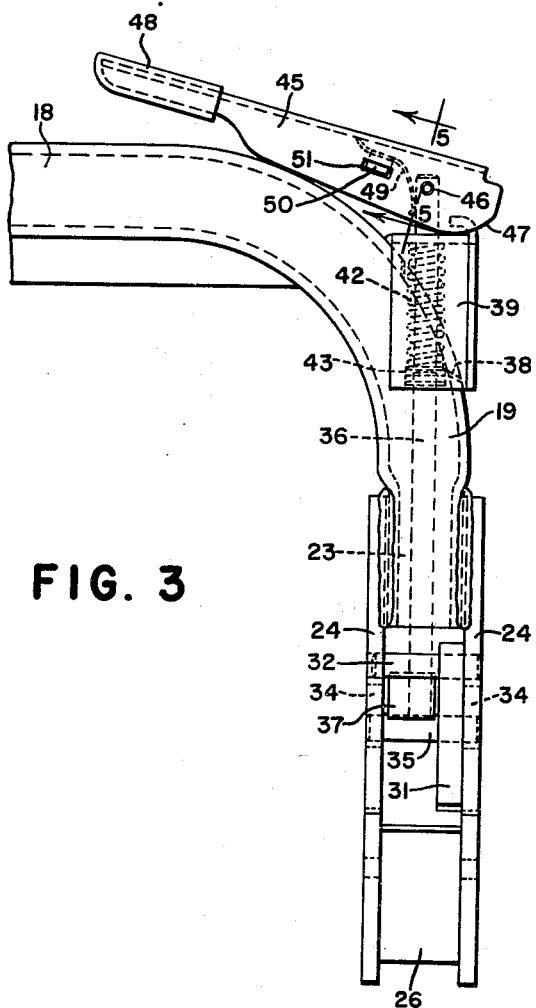
FIG. 3 is an enlarged view of one of the legs of the coupler illustrated in FIG. 2.
Figure 4:
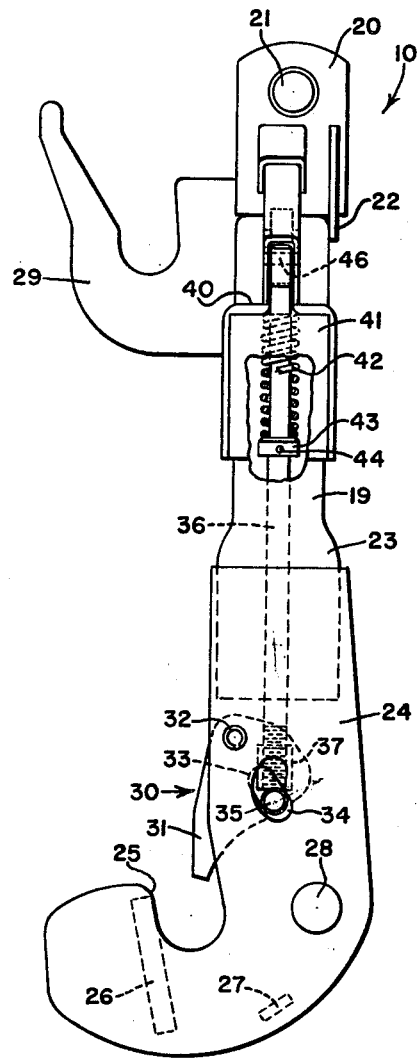
FIG. 4 is an enlarged side elevational view of the coupler illustrated in FIG. 2.

As best illustrated in FIGS. 3 and 4, each hook 25 is provided with an associated latching mechanism indicated generally at 30 which will hold the lower implement pins in the hooks 25 during operation. Each latching mechanism 30 includes a latch plate 31 which is pivotally mounted between a pair of jaw plates 24 by a spring pin 32. The latch plate 31 will pivot about the pin 32 between an operative position in which the lower end of the plate 31 extends from between the pair of jaw plates 24 and overlies the opening of the hook 25 and an inoperative position in which the latch plate 31 is positioned wholly between the pair of jaw plates 24. To control the movement of the latch plate 31, cooperating slots 33 and 34 are provided in the latch plate 31 and jaw plates 24 respectively, and a pin 35 extends through the cooperating slots. The slot 33 provided in the latch plate 31 is positioned generally radially with respect to the pin 32 and extends generally downwardly and in the direction of movement of the latch plate 31 when moved to its inoperative position. The slots 34 provided in the jaw plates 24 are positioned with their major dimension extending generally vertically and are of arcuate shape with the concave side thereof extending generally in the direction of movement of the latch plate 31 when moved to its inoperative position. The latching mechanism described so far operates as follows. When the pin 35 is moved upwardly within the slots 34, it cams against the upper wall of the slot 33 and pivots the latch plate 31 about the pin 32 in a counterclockwise direction as viewed in FIG. 4 to move the lower end of the latch plate 31 to an inoperative position between the jaw plates 24. Downward movement of the pin 35 in the slot 34 will cause the pin 35 to cam against the lower wall of the slot 33 and pivot the latch palte 31 about the pin 32 in a clockwise direction as viewed in FIG. 4 to move the lower end of the latch plate 31 to its operative position overlying the opening in the hook 25. When the pin 35 is at the lower end of the slot 34, the latch plate 31 is positively locked in its operative position. The locking feature is obtained by the arcuate shape of the slot 34. Thus, if a force is applied on the latch plate 31 other than by the pin 35 which urges the latch plate 31 to its inoperative position, the lower wall of the slot 33 will bear against the pin 35 and tend to force the pin 35 forwardly and upwardly. However, because of the arcuate shape of the slot 34, the initial movement of the pin 35 must be upwardly and rearwardly. Therefore, it can be seen that movement of the latch plate 31 can be initiated only by movement of the pin 35.

The movements of the pin 35 are controlled by the operator through a rod 36. The lower end of the rod 36 is threadably received within a bore provided in a block 37 which is secured to the pin 35 in any suitable manner such as welding. The rod 36 extends upwardly between the jaw plates 24 through the leg 19, and through an opening 38 provided in an inverted U-shaped member substantially at the juncture of the leg 19 and the transverse member 18. The opening 38 is covered by an inverted U-shaped member which includes a pair of depending legs 39 which straddle and are secured to the leg 19 and an upper bight portion 40 which overlies the opening 38 and has one edge secured to the member 17 adjacent the opening 38. A plate 41 is secured to the edges of the legs 39 and completes an enclosure for the opening 38. The bight 40 of the U-shaped member is provided with an opening which receives and guides the upper end of the rod 36. The rod 36 is normally urged downwardly by a spring 42 which acts between the bight portion 40 of the U-shaped cover for the opening 38 and a sleeve 43 which is secured to the rod 36 by a pin 44.

Figure 5:
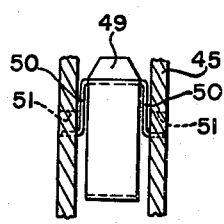
FIG. 5 is a view taken substantially along the line 5—5 of FIG. 3.

A lever 45 is pivotally mounted intermediate its ends to the upper end of the rod 36 by a pin 46. The lever 45 is channel shaped and the pin 46 extends through suitable openings provided in the legs of the channel-shaped lever 45 and an opening provided through the upper end of the rod 36 which extends between the legs of the channel-shaped lever 45. One end of the lever 45 is rounded as at 47 to provide a cam which cooperates with the upper surface of the bight 40 of the inverted U-shaped cover for the opening 38 to move the rod 36 upwardly when the lever is pivoted in a clockwise direction as viewed in FIG. 3. The opposite end of the lever 45 is provided with a smooth covering 48 to provide a hand grip. The lever 45 is normally urged in a clockwise direction about the pivot 46 by a spring 49. The spring 49 acts between the rod 36 and the lever 35, and is held in position by a pair of legs 50 which extend through openings 51 provided in the legs of the channel-shaped lever 45 as best illustrated in FIG. 5.

From the above it can be seen that when it is desired to attach an implement to the quick coupler, the lever 45 is pivoted about the pin 46 in a clockwise direction to raise the rod 36 and move the latch plate 31 to its inoperative position. When the lever 45 is moved to a position wherein it extends substantially longitudinally with respect to the rod 36, the latch plate 31 is in its inoperative position. After the hooks 25 and 29 have engaged the hitch pins on an associated implement as previously described, the latch plates 31 are moved to an operative position by pivoting the lever 45 about the pin 46 in a counterclockwise direction to the position illustrated in FIG. 3. As the rounded end 47 of the rod 45 moves off of the bight 40 of the U-shaped cover for the opening 38, the spring 42 moves the rod downwardly to cause the pin 35 to cam against the latch plate 31 and move it to its operative position. When the lever 45 is in the position illustrated in FIG. 3 and the spring 42 has moved the rod 36 downwardly, the spring 49 will be inoperative to return the lever 45 to a position in which it extends substantially longitudinally with respect to the rod 36 since the spring 42, acting through the rod 36, will hold the lever 45 in position. However, should the spring 42 fail to move the rod 36 downwardly when the lever 45 is moved to the position illustrated in FIG. 3, the spring 49 will return the rod 45 to a position in which it extends substantially longitudinally with respect to the rod 36 and thereby give a signal to the operator that the spring 42 has failed to move the latch plate 31 to its operative position.

I claim:

1. An implement coupler adapted to connect a tractor having power-operated hitch links to an implement having upper connection means and generally transversely extending lower hitch pins; the coupler comprising: a transverse bight, a pair of depending legs, means adapted to receive the rear ends of said hitch links, means on said bight adapted to receive said upper connection means, hook means on said legs adapted to receive said hitch pins, and latching means carried by each of said legs and adapted to hold said hitch pins within said hook means, each of said latching means comprising a latch plate pivotally mounted to its associated leg and movable between operative and inoperative positions, cooperating slot means provided in said latch plate and said associated leg, the slot means provided in said latch plate extending obliquely with respect to the slot means provided in said associated leg, pin means extending through said cooperating slot means, and means to move said pin means along the slot means provided in said associated leg whereby upon movement of said pin means said latch plate will be moved between its operative and inoperative positions by a camming action of said pin means on the walls of the slot means provided in said latch plate.

2. The implement coupler as set forth in claim 1 wherein the slot means provided in said associated leg extends generally longitudinally of said associated leg, said means to move said pin means includes a rod member secured at its lower end to said pin means and extending upwardly along the length of said associated leg through a guide plate mounted at approximately the juncture of said bight and associated leg, a lever pivotally mounted on the upper end of said rod member, cam means on said lever and cooperable with said guide plate to forcibly move said rod member upwardly when said lever is pivoted to a first position.

3. The implement coupler as set forth in claim 2 wherein spring means act on said rod member and bias said rod member downwardly whereby when said lever is moved from said first position to a second position, said spring means moves said rod member downwardly, and resilient means urge said lever toward said first position whereby if said spring means fail to move said rod member downwardly when said lever is moved to said second position, said resilient means will automatically return said lever to said first position.

4. The implement coupler as set forth in claim 1 wherein said slot means provided in said associated leg is positioned with its major dimension extending generally vertically and said slot means provided in said latch plate is positioned with its major dimension extending generally downwardly and in the direction which said latch plate moves when moved to its inoperative position whereby downward movement of said pin means moves said latch plate to its operative position and upward movement of said pin means moves said latch plate to its inoperative position.

5. The implement coupler as set forth in claim 4 wherein the slot means provided in said associated leg is curved along its major dimension with the concave side thereof facing generally in the direction which said latch plate moves when moved to its inoperative position whereby said pin means and cooperating slot means lock said latch plate in its operative position.

6. An implement coupler adapted to connect a tractor having power-operated hitch links to an implement having upper connecting means and generally transversely extending lower hitch pins; the coupler comprising: a generally inverted U-shaped member having a transverse bight portion and a pair of depending legs, means on said member adapted to receive the rear ends of said hitch links, means on said bight portion adapted to receive said upper connection means, hook means on said legs adapted to receive said hitch pins, latching means carried by each of said legs adapted to hold said hitch pins in said hook means and movable between operative and inoperative positions, control means to move each of said latching means between said operative and inoperative positions, each of said control means including a vertically movable rod member extending from said latching means upwardly along the associated leg through a guide plate secured to said inverted U-shaped member, means associated with the lower end of said rod member and said latching means and operative to move said latching means between said positions upon vertical movement of said rod member, lever means pivotally attached to the upper end of said rod member and movable between a first position in which it extends generally longitudinally of said associated leg and a second position in which it extends generally normal to said associated leg and overlies said bight portion, and cam means on said lever cooperable with said guide plate to move said rod member upwardly when said lever is moved to its first position.

7. The implement coupler as set forth in claim 6 wherein said means associated with the lower end of said rod member and said latching means is operative to move said latching means to its operative position upon downward movement of said rod member and to its inoperative position upon upward movement of said rod member, each of said control means further including first spring means urging said rod member downwardly to move said latching means to its operative position when said lever is moved to its second position, and second spring means urging said lever to its first position whereby when said lever is moved to its second position and said first spring means fail to move said rod downwardly to move said latching means to its operative position, said second spring means will return said lever to its first position.

References Cited

UNITED STATES PATENTS

| | | | |
|---|---|---|---|
| 2,979,137 | 4/1961 | Hess | 172—272 |
| 3,116,075 | 12/1963 | Hershman et al. | 280—479 |
| 3,172,686 | 3/1965 | Beard | 280—461 |
| 3,195,651 | 7/1965 | Todd | 172—272 |

LEO FRIAGLIA, Primary Examiner

U.S. Cl. X.R.

172—272, 439; 280—461